Figure 3:
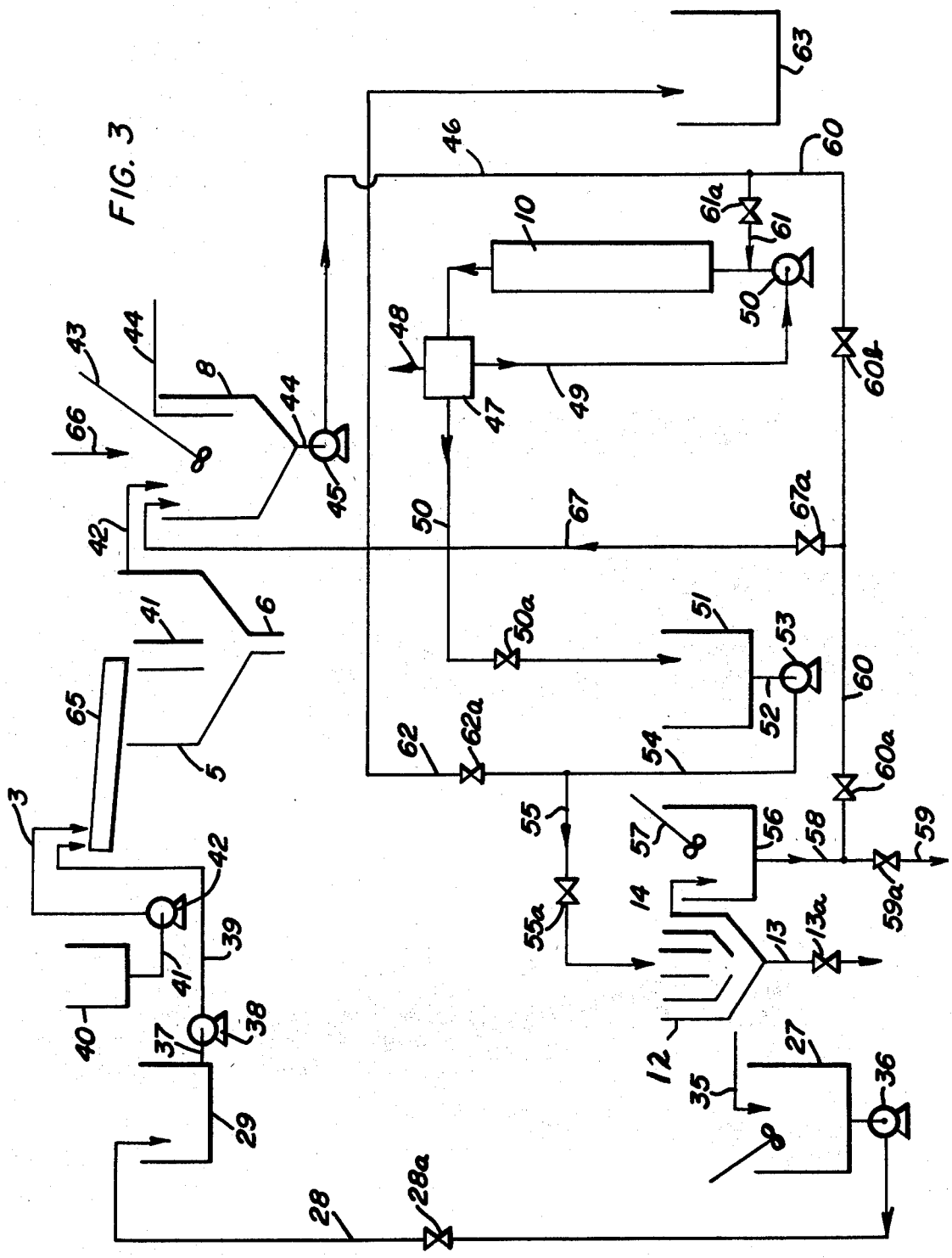

ary Examiner—O. R. Vertiz

United States Patent [19]

Hill

[11] 4,110,422
[45] Aug. 29, 1978

[54] PRODUCTION OF STABILIZED WET PROCESS PHOSPHORIC ACID

[75] Inventor: Richard Newton Hill, Lakeland, Fla.

[73] Assignee: W. R. Grace & Co., New York, N.Y.

[21] Appl. No.: 812,319

[22] Filed: Jul. 1, 1977

Related U.S. Application Data

[63] Continuation-in-part of Ser. No. 683,756, May 6, 1976, abandoned.

[51] Int. Cl.$^2$ ............................................. C01B 25/16
[52] U.S. Cl. ........................................ 423/317; 71/32; 423/321 R
[58] Field of Search ................ 423/317, 321 R; 71/32

[56] References Cited

U.S. PATENT DOCUMENTS

| 2,883,266 | 4/1959 | Hodges et al. | 423/321 R |
| 2,987,376 | 6/1961 | Gloss | 423/321 R |
| 3,141,734 | 7/1964 | Itilinger | 423/321 R |
| 3,151,941 | 10/1964 | Hollingsworth et al. | 423/321 R |
| 3,193,351 | 7/1965 | Miller et al. | 423/321 R |
| 3,528,771 | 9/1970 | Shearon et al. | 423/321 R |
| 3,907,680 | 9/1975 | Hill | 423/321 R |
| 4,048,289 | 9/1977 | Pierres | 423/321 R |

FOREIGN PATENT DOCUMENTS

| 776,577 | 1/1968 | Canada | 423/317 |
| 637,832 | 3/1962 | Canada | 423/321 R |
| 463,505 | 3/1950 | Canada | 423/321 R |
| 64-13,920 | 5/1966 | Netherlands | 423/321 R |
| 1,010,107 | 11/1965 | United Kingdom | 423/321 R |
| 1,113,922 | 5/1968 | United Kingdom | 423/321 R |
| 479,726 | 12/1975 | U.S.S.R. | 423/321 R |

*Primary Examiner*—O. R. Vertiz
*Assistant Examiner*—Eugene T. Wheelock
*Attorney, Agent, or Firm*—Charles L. Harness

[57] ABSTRACT

Treatment of wet process phosphoric acid to inhibit post-precipitation by steps including addition of an aluminum silicate material such as perlite or the like to dilute acid from which a major portion of solids has been removed, concentration of the resulting dilute acid, and removal of resulting precipitate.

16 Claims, 3 Drawing Figures

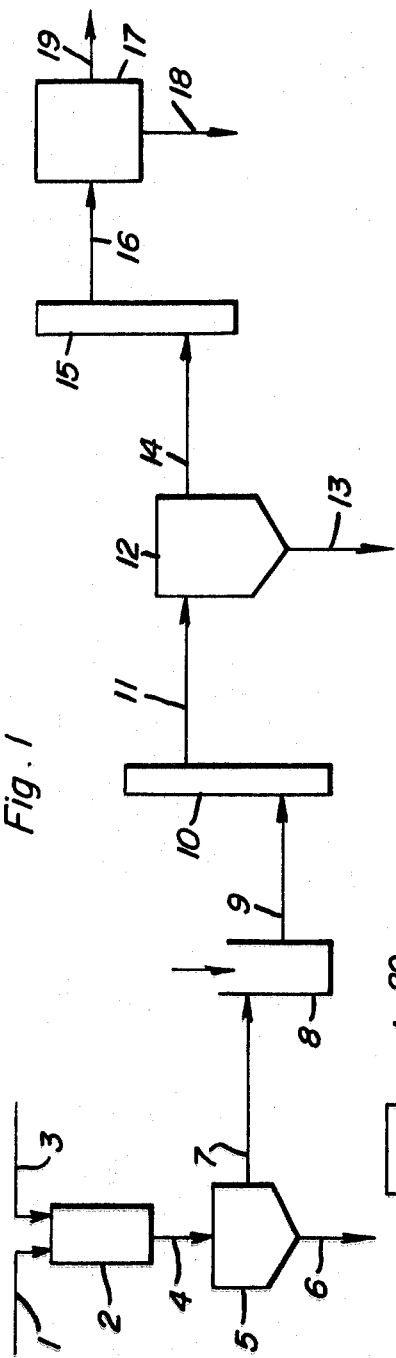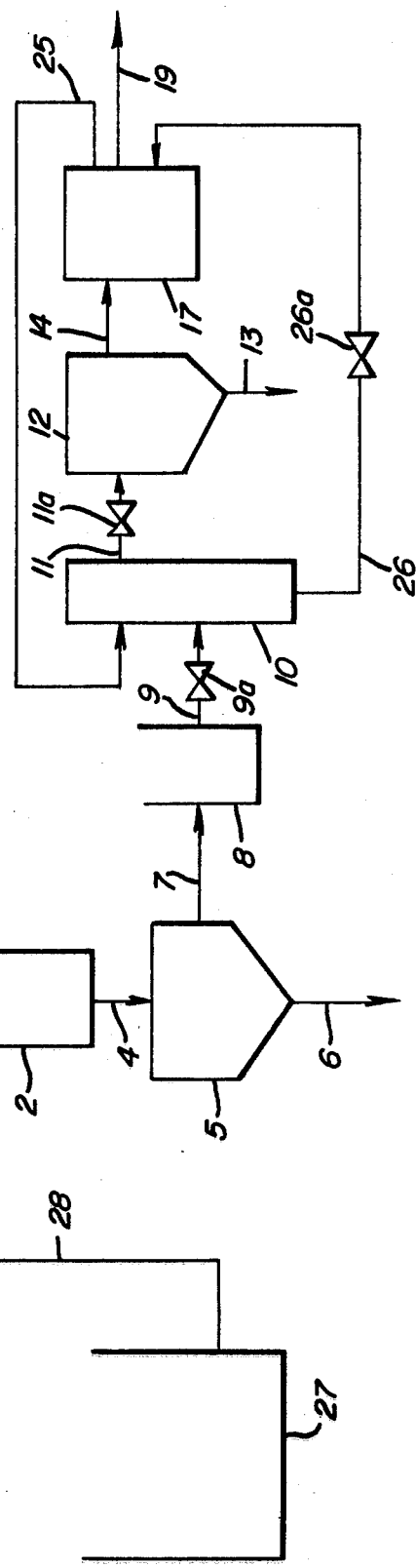

PRODUCTION OF STABILIZED WET PROCESS PHOSPHORIC ACID

This is a continuation-in-part of my copending application Ser. No. 683,756, filed May 6, 1976, now abandoned.

BACKGROUND OF THE INVENTION

The conventional methods for the production of wet process phosphoric acid, finely ground phosphate rock is reacted with dilute phosphoric acid (10% $P_2O_5$ to 25% $P_2O_5$) and sulphuric acid which may or may not be diluted. The reaction product is leached (i.e., digested or reacted with the acid) to yield a crude aqueous phosphoric acid solution in which is suspended a substantial quantity of solid impurities. This slurry is filtered to separate most of the undissolved gypsum and other solid impurities to yield a crude (22% $P_2O_5$ to 35% $P_2O_5$) aqueous product sometimes known as the number one filtrate. This filtrate contains suspended, finely divided, impurities that were not removed during the solidliquid separation step plus solids that have crystallized after filtration. The solution also contains dissolved impurities. Reference is made to Chapter 16 of Volume II, Phosphorus and its Compounds, Van Wazer, Interscience Publishers (1961).

The problems occasioned by suspended and dissolved impurities are particularly acute with respect to wet process phosphoric acid. Variable quantities of impurities in the phosphate rock such as organics, calcium, potassium, sodium, aluminum, iron, strontium, titanium, silicon, uranium, vanadium, fluorine, magnesium, etc. are put into solution during the reaction of the phosphate rock with sulphuric and/or phosphoric acid. Standing, cooling, or concentration of the phosphoric acid solution results in additional solids being formed and precipitated to form a sludge consisting mainly of complexed iron, aluminum, potassium, sodium, calcium, etc.; and phosphates, fluorides, silicates, sulphates, etc. This is known in the art as post-precipitation.

Concentrated wet process phosphoric acid, upon standing or during shipment in tank cars or the like, deposits a layer of solid matter forming sludge as above described, which renders handling stored or shipped acid exceedingly difficult and frequently economically unfeasible. Some solids may be removed from the crude solution by conventional filtration or centrifugation. With respect to conventional filtration, however, the concentrated acid is very viscous and difficult to filter. Further, the solids are of such nature that they readily blind the filter cloth and the solids are difficult to remove from the filter. With respect to conventional centrifugation, many of the finely divided solids will not be removed, particularly the organic particles, which are lighter and are not removed with the larger heavier inorganic solids from the solution.

SUMMARY OF THE INVENTION

This invention relates to a method of inhibiting post-precipitation in concentrated phosphoric acid and to the resultant product, which may be stored for long periods or shipped long distances without appreciable post-precipitation. In accordance with the present invention it has been discovered that an eminently satisfactory clarified, stabilized, concentrated phosphoric acid, produced from crude wet process phosphoric acid, can be achieved by means of a series of specific but interdependent steps.

My invention requires a clarified filtrate. If the available No. 1 filtrate contains suspended solids, it must first be clarified. Crude phosphoric acid from the conventional wet process acid filter at 22% to 35% $P_2O_5$ concentration (No. 1 filtrate) ordinarily contains 0.5-8.0 wt. % suspended solids and accordingly is first substantially clarified. In this step it has been found satisfactory to remove 85% to 98% by volume of the suspended solids. These solids may be returned to the digestion circuit or to the phosphoric acid filter food tank.

The clarified acid with less than 2% by volume of suspended solids is next mixed with an aluminum silicate material, preferably perlite, e.g., perlite filter aid, then passed to a conventional wet process phosphoric acid evaporator. After reaching a concentration of 48% to 50% $P_2O_5$ the evaporator product is introduced to a crystallizer, then subjected to settling where a small portion is removed as underflow containing approximately 10 to 40% by weight of solids. This underflow may be returned to the 30% filter feed tank or to diammonium phosphate, run-of-pile triplesuperphosphate, or granular triplesuperphosphate circuit, or it may be separated by centrifugation or filtration to recover the $P_2O_5$ values. The overflow preferably goes to another evaporator and is brought up to 52 to 63% $P_2O_5$ preferably 60 % $P_2O_5$. This product may be immediately loaded in a tank car or stored in tanks until ready to be shipped or used.

In the drawings, FIGS. 1, 2, and 3 show in schematic form flow sheets for several embodiments of the invention.

FIG. 1 is a simplified flowsheet for a hypothetical large scale commercial plant, for making 1000 tons per day of 100% $P_2O_5$, as contained in the final product, which is phosphoric acid concentrated to 60% $P_2O_5$. FIG. 2 is basically like FIG. 1 except that the quantities have been reduced to pilot plant size, and certain modifications have correspondingly been made (e.g., one evaporator is used for two stages of concentration). FIG. 3 is also a flow diagram for a pilot plant, again using one evaporator, but with additional flow options, including a preferred type of crystallizer.

GENERAL DESCRIPTION

The steps in order are then:

1. Clarification in the 22 to 35% $P_2O_5$ range, if an already clarified dilute acid is not available.

2. Addition of aluminum silicate material, e.g., perlite or other aluminum silicate suitably in company with small amounts of sodium and potassium compounds, all finely divided so as to be soluble in phosphoric acid as the concentration is increased from approximately 22-35% $P_2O_5$ to approximately 42-52% $P_2O_5$. Perlite is a naturally occuring mineral, being a type of volcanic glass, and is available commercially in various grades. The product is an aluminum silicate with varying amounts of sodium and potassium silicates.

Typical analyses of suitable grades of perlite preferred for use in this invention are shown below. The first column gives the analysis of the filter aid grade of perlite used in the examples in this specification. The second column gives a weight range of perlite components, suitable for use in this invention.

Table 1
Suitable Grades of Perlite

| Component | Col. 1, Wt. % | Col. 2, Wt. % |
| --- | --- | --- |
| Silica ($SiO_2$) | 73.41 | 67.05 – 74.82 |
| Alumina ($Al_2O_3$) | 12.34 | 10.82 – 18.55 |
| Iron Oxide ($Fe_2O_3$) | 1.33 | 0.25 – 3.19 |
| Magnesium Oxide (MgO) | .1 | .01 – .70 |
| Calcium Oxide (CaO) | .75 | 0.78 – 3.8 |
| Sodium Oxide ($Na_2O$) | 2.95 | 1.2 – 4.15 |
| Potassium Oxide ($K_2O$) | 5.33 | 2.24 – 5.6 |
| Phosphorus Oxide ($P_2O_5$) | | 0.01 – 0.12 |
| Manganese Oxide ($MnO_2$) | | 0.02 – 0.04 |

The preferred varieties of perlite contain 2–6% trapped $H_2O$ and a $Na_2O:K_2O$ weight ratio in the range of about 1/1–1/4. Material of this type dissolves in the acid mostly during the evaporation step. Very little seems to dissolve on simple mixing. The ability of the perlite or other aluminum silicate material to dissolve in the acid is regarded as essential in the practice of this invention. Of the available grades of perlite, I have found that two are particularly advantageous in carrying out my invention. One of these grades is filter aid grade. The other is light weight plaster aggregate grade, which should be crushed for this use. Both forms are available commercially. Both are made by "popping" mineral perlite in a furnace, i.e., heating it at about 1500°–2000° F. so that the contained water forms bubbles in the softened glass, whereby the particles are expanded to 15 or 20 times their original volume.

I can add 1–40 lbs. of perlite or other aluminum silicate material per ton of equivalent $P_2O_5$ contained in the acid, or 0.05–2.0 wt. % based on the $P_2O_5$ in the acid. All tons herein are short tons (2,000 lbs.).

(Continuing now with the steps of the process:)

3. Concentration to 42–52% $P_2O_5$ acid.
4. Removal to a crystallizer where the fresh 42 to 52% acid is continuously fed to a recirculating acid volume.
5. Sedimentation of the crystallized product and removal of a portion of the underflow.
6. Preferably concentration of the overflow to 52–63% $P_2O_5$ product.

Based on pilot plant operation it has been found that the preferred method of clarification, step 1 above (where necessary) is one of settling under specific conditions. Filtrate from a conventional filter is pumped to the head box of a mixing launder, where a polymeric flocculant is also added. Polyhall M295, a polyacrylamide-type flocculant commercially available from Stein, Hall & Co., Inc., of New York, N. Y., has been successfully used at a wt. concentration in water of 0.085%. This concentration has been varied from 0.02 to 0.4% by wt. in water without noticeably affecting the results. The Polyhall solution is added to the filtrate at a rate of 0.2% to 3.8% by volume of the 22% to 35 % filtrate preferably 0.8% by volume.

Numerous other flocculants are available for clarification. Examples include water soluble high molecular weight synthetic polymers, guar, etc.

The polyacrylamides and the hydrolyzed polyacrylonitrile resins and their salts and derivatives are particularly useful. Flocculants are used conventionally in the phosphoric acid industry in settling higher concentrations of acid, e.g., 42%, 52% and 54%. Such flocculants are available commercially and are useful in this invention.

A temperature drop of the filtrate of 1° C. to 20° C. is beneficial to proper clarification. The feed to the clarifier has been found to be satisfactory from 30° to 65° C. with best results obtained between 46° C. to 54° C. The temperature drop was best accomplished in a launder which has partial baffles so the polymer-filtrate mixture must follow a zig-zag path before discharging to a stilling well in the clarifier. In the pilot plant for 5 to 10 GPM (cf. Example 3) the launder was 6 inch wide with sides 6 inches high and 8 feet - 0 inch long sloped 2 on 12 or about 9-½° off the horizontal, having 10 baffles 4 inches wide by 4 inches high and alternately attached to the launder sides. This provided a gentle but thorough mixing and cooling action. A mix tank can be used, but care must be taken to stir very slowly, so as not to disintegrate the flocs.

The pilot plant clarifier of nominal 50 sq. ft. has been able to satisfactorily operate up to 10 GPM. Nominal rates have been 6 GPM to 8 GPM or 8-⅓ sq. ft. per GPM to 6-¼ sq. ft. per GPM. Satisfactory results have been achieved at a rate of 5 sq. ft. per GPM. Since phosphate rock is a mineral found in nature, its composition is not always uniform. It has been found by experience that some dilute acids produced may require up to 20 sq. ft. per GPM for acceptable clarity.

Experience has also shown that an underflow rate of 2 to 25% by volume of the feed is desirable. For instance for a nominal clarifier feed rate of 6 GPM containing 1 to 3% by wt. of suspended solids, the underflow rate was 0.48 GPM or about 8% by volume of the feed.

The retention time in the clarifier, based on 6 GPM feed rate to the clarifier was about 73 minutes. Good results have been obtained with retention times as low as 43 minutes.

Underflow from the clarifier may be filtered and washed and the solids discarded. Tests have shown that the filtration rate of the underflow was in excess of 100 gallons per square foot per hour, and the cake washes readily with water. This cake averages 25 to 45% moisture and on a dry basis contained less than 4% $P_2O_5$. In the pilot plant the underflow was returned to the conventional filter.

Depending on the grade of rock used for digestion in the conventional acid plant there are times when a small amount of the flocculated material will float rather than sink. To overcome this a baffle is placed in front of the overflow weir in the clarifier and a skimming device such as shown on page 19-50 of *Chemical Engineers Handbook*, Perry, Chilton and Kirkpatrick, 4th edition, McGraw-Hill Book Co., New York. This float material after skimming is combined with the underflow, outside of the clarifier, for ultimate disposal.

A typical analysis of the clarifier feed after having been mixed with the polymer solution on an as is basis is given in Table 2 below (following Example 3) as "Clarifier Inlet".

Typical analyses of the clarifier underflow and overflow on an as is basis are shown in the same Table.

The clarifier overflow is next mixed with an aluminum silicate material, preferably a good commercial grade of perlite filter aid. Such material, e.g., perlite is added at a rate of 1 to 40 lbs. per ton of $P_2O_5$ (0.05–2.0 wt. %), generally 5 to 15 lbs. perlite per ton $P_2O_5$ (0.25–0.75 wt. %) but more preferably 6 to 8 lbs. per ton $P_2O_5$ (0.3–0.4 wt. %). After mixing, the perlite-acid mixture is fed to a conventional evaporator. The product of this evaporation may be taken off at 42% $P_2O_5$ or higher although 46 to 50% $P_2O_5$ is the preferred range, however, even up to 52% is not detrimental. The most preferred range, however, is 48 to 50% $P_2O_5$.

After this first evaporation the evaporator product is introduced to a crystallizer. Here the incoming acid is preferably mixed with acid that has had at least 30 min. and even more preferably 1 to 3 hours recycling in a crystallizer provided with a recycle tube and cone tank. The ratio of recycle acid to incoming feed is best at 1:1 to 30:1. The cone is tapered and equipped with rakes to discharge the acid-crystal product from a centrally located annular opening at the bottom. Recycling is accomplished by bubbling air within the inner tube causing an air lift.

The product of the crystallizer is subjected to gravity settling for a period of time sufficient to allow the heavier crystals to settle out. These settling crystals form a slurry of about 25% by wt. of solids. This slurry which is approximately 1 to 10% by volume of the crystallizer feed, and generally 2 to 4% by volume, then may either be used to make dry products such as diammonium phosphate, triple superphosphate, or run-of-pile triple superphosphate or may be sent to the conventional 30% acid filter.

The settler overflow can be accepted as final product. However it is next preferably evaporated to 52–63% $P_2O_5$ concentration, and preferably to about 60%. This product, which is now clarified and stabilized, may be shipped directly or sent to storage tanks until ready for use. Some additional solids may come out because of cooling; however, these solids are generally less than ⅛% by wt. and do not cause excessive post-precipitation.

Post precipitation in wet process phosphoric acid has always been a problem. According to *Encyclopedia of Chemical Technology*, 2nd Edition, Vol. 9, p. 87:

"When wet-process acid is to be used in another process in the same plant operation, a relatively high content of impurities can be tolerated. But when it is to be shipped away from the point of production, for use as a merchant material or in some other plant of the producing company, the solid impurities are removed to the extent that problems in shipping and handling are reduced. The major constituent of most sludges containing from 52 to 54% $P_2O_5$ acid is a complex salt with the composition $(Fe,Al)_3KH_{14}(PO_4)_8 \cdot 4H_2O$. Its composition is quite uniform except for variations in the iron/aluminum ratio. The extent of formation depends on the amount of potassium in the rock; a small amount can precipitate a major part of the iron and aluminum because the compound contains only about 4% potassium. Precipitation continues over a long period in storage until practically all the potassium is removed. Other dissolved impurities such as sulfate, chloride, and fluoride affect the rate of precipitation." [Emphasis supplied.]

Accordingly K-containing compounds may be contraindicated as additives for the prevention of post-precipitation. Hence it is surprising that perlite, which contains potassium, is effective for this purpose. And, as a matter of fact, as shown in Table 2 below (following Example 3), my final product contains a sizeable amount of $K_2O$. Nevertheless post-precipitation is inhibited to a substantial extent.

EXAMPLE 1

This example has not actually been carried out, but is based on my information and belief, and especially on the results of my work in a small pilot plant.

Reference is made to FIG. 1. Based on a hypothetical production of 1000 tons per day of 100% $P_2O_5$, as contained in 60% $P_2O_5$ phosphoric acid, the quantities noted apply. The feed stream is No. 1 filtrate analyzing about 29.3% $P_2O_5$. The quantity of feed is 1085 tons per day $P_2O_5$, equivalent to about 450 gallons per minute with a specific gravity of about 1.34. This No. 1 filtrate enters via line 1 into a mixing vessel 2. There is also added to the mixing vessel 2 a flocculant solution. The particular flocculant is a polyacrylamide derivative available commercially as "Polyhall", from Stein, Hall & Co., Inc. This flocculant is prepared as an aqueous solution, 0.085% weight of flocculant in water. This aqueous solution of flocculant is added via line 3 to mixer 2 as a 1% by volume of feed, i.e., 4.5 gallons per minute of flocculant solution. This is equivalent to 45.9 lbs. per day of dry flocculant. The mixture of No. 1 filtrate and flocculant is then passed via line 4 to clarifier 5. Within the clarifier, the flocculant aids in the rapid and thorough settling of suspended solids contained in the No. 1 filtrate. These solids are typically 3.0% of the total weight of the No. 1 filtrate. Two streams are drawn from the clarifier, namely the underflow at line 6 and the product stream at line 7. The underflow at line 6 approximates 8% by volume of the feed going into the clarifier. Thus this underflow exits the clarifier at a rate typically 36 gallons per minute of slurry, equivalent to 304 tons per day of slurry having a specific gravity of 1.41. This stream is returned to the filter. By filter is meant the main filter separating gypsum from the No. 1 filtrate. The underflow comprises about 27 wt. % solids which analyzes about 4% $P_2O_5$ by weight on a washed dry basis.

Returning now to produce stream 7, this exits the clarifier at the rate of 1020 tons per day of $P_2O_5$, equivalent to about 414 gallons per minute of liquid with a specific gravity of about 1.32. This stream proceeds to mixing tank 8, where perlite is added at the rate of 10,850 lbs. per day of perlite, or about 10 lb./ton of $P_2O_5$ in the incoming stream. This material is thoroughly mixed with the liquid in tank 8. A production stream is drawn off through line 9 continuously from mixing tank 8. This stream has very nearly the composition of incoming stream 7, to wit, 1020 tons per day $P_2O_5$, 414 gallons per minute, specific gravity 1.32. This stream now proceeds to evaporator 10, where it is heated to 85° C. under an absolute pressure of 4–6 inches of mercury, to evaporate the product to approximately 50% $P_2O_5$. This product exits the evaporator 10 via line 11 to crystallizer 12. The product entering crystallizer 12 flows at the rate of 1020 tons per day $P_2O_5$, 210 gallons per minute, and has a specific gravity of about 1.62. The crystallizer 12 provides 2 streams, an underflow stream at 13 and a product stream at 14. The underflow stream at 13 is about 2% by volume of the feed. Thus it is about 4 gallons per minute of slurry of 43.2 tons per day of slurry. It has a specific gravity of about 1.8. Stream 13 contains sufficient $P_2O_5$ to warrant recovery of its $P_2O_5$ content. Stream 13 comprises about 25% by weight of solids and about 75% by weight of liquid recoverable as filtrate. The solids comprise 4.3 tons per day of $P_2O_5$. This high content of $P_2O_5$ precludes returning underflow 13 to the primary filter, since it would be irrevocably lost with the gypsum. Hence it should be sent to various recovery systems such as run-of-pile, or granular triple superphosphate, for plants having such facilities. The liquid portion of underflow 13 comprises 14.9 tons per day of $P_2O_5$ containing 46 to 50% $P_2O_5$. If underflow 13 is recovered in the manner recommended it would, of course, recover both solids and liquid, and hence recover all of the $P_2O_5$.

Returning now to produce stream 14, this exits the crystallizer at the rate of 1001 tons per day of $P_2O_5$ equivalent to 206 gallons per minute, having a specific gravity of about 1.62. This stream goes to a second evaporator 15, where it is concentrated to a product containing about 60% $P_2O_5$ by heating to a temperature of about 85°-90° C. and under a vacuum of about 1-2 inches of mercury, absolute pressure. In this second evaporator there may be expected some very small loss of $P_2O_5$ in the condenser. The product exits the evaporator via line 16 and proceeds to storage tank 17. Storage tank 17 is preferably equipped with means to draw off any sludge that collects on the bottom. In the latter manner about one ton per day of $P_2O_5$ (as contained in the 60% $P_2O_5$ acid) is drawn off through line 18. The final effluent line is shown at 19, and through this line there is available 1000 tons per day of 60% $P_2O_5$ wet process phosphoric acid.

To convert the foregoing quantities to a pilot plant scale the quantities given are simply reduced by a factor corresponding to the size of the pilot plant. For example, I used a pilot plant with varying capacity, but nominally about 11.6 tons per day of $P_2O_5$, as 60% $P_2O_5$ acid. Thus all quantities were divided by a factor of 86. This means that the acid feed flowing through line 1 was at the rate of 12.6 tons per day $P_2O_5$, or 5.23 GPM. Overflow from the clarifier was typically 11.86 tons per day $P_2O_5$, and underflow was typically 0.42 GPM. Perlite was added to the mixing tank 8 at a rate typically 118.6 pounds per day. Feed from the mixing tank 8 to the evaporator 10 is typically 11.86 tons per day $P_2O_5$ of clarified acid, or about 4.88 GPM. Product leaving evaporator 10 is likewise about 11.86 tons per day $P_2O_5$, at about 2.33 GPM. Underflow from crystallizer 12 is typically 0.05 GPM. Overflow is typically 11.63 tons per day $P_2O_5$ at the rate of about 2.33 GPM. The overflow product goes to evaporator 15, and here the effluent provides about 11.63 tons per day $P_2O_5$, collectible in storage tank 17 as the final 60% product.

EXAMPLE 2

This embodiment differs in certain respects from that described in Example 1. The main difference in the equipment was the use of one evaporator in lieu of the two evaporators described in Example 1. In this example, for the sake of economy, one evaporator was used in the pilot plant for both concentration steps. In the first evaporation step 29% acid was concentrated to acid analyzing about 50% $P_2O_5$. This product was then collected and run back through the evaporator to concentrate it to 60% $P_2O_5$ acid. There are various ways of doing this. One system is shown in FIG. 2. In FIG. 2 it will be noted that the same equipment of FIG. 1 is retained, except that evaporator 15 is omitted and a 30% acid feed tank 27 is added. Referring again to FIG. 2, one evaporator can be utilized in the following way. 30% acid is run into feed tank 27. This is a holding tank with a capacity of 4000 to 6000 gallons. This acid exits via line 28 into a small surge tank 29 of about 200 gallons capacity. Operations then proceed substantially as described in Example 1 through mixer 3, clarifier 5, mixer 8, and thence to evaporator 10. Here the product is evaporated to 50% $P_2O_5$ acid as in the preceding example, passes into crystallizer 12, and thence into storage tank 17, where it is collected. At this point valve 9a is closed, and the 50% acid is pumped from storage tank 17 back to evaporator 10, where it is next concentrated to 60% $P_2O_5$ acid. Following this concentration, it exits the evaporator there via line 26 through open valve 26a, thence to storage tank 17. There are of course numerous alternates to this scheme for using one evaporator instead of a plurality of evaporators. A further modification involves the use of two separate storage tanks, one for the acid first concentrated, e.g., to 50%, and the other for acid as concentrated a second time, e.g., to 60% $P_2O_5$. The lines are appropriately valved to avoid backflow and improper mixing.

A curious effect of the use of one evaporator for two evaporations was noted. During the first evaporation step, where 29-30% acid was evaporated to 50% acid, some scaling was noted on the evaporator walls. During the second evaporation, where the 50% acid was concentrated to 60% acid, this scaling was completely removed.

EXAMPLE 3

Reference is made to FIG. 3. Primary filtrate flows through line 35 into storage vessel 27. This vessel is conveniently 4000-6000 gallons capacity. Product from this storage vessel is pumped via pump 36 and line 28 into surge tank 29. The latter has about 200 gallons capacity and is heated by steam coils to about 47° C. The product is then pumped via line 37 and pump 38 followed by line 39 to launder 65. Meanwhile a solution of flocculant is mixed with water in vessel 40, and it is pumped therefrom via line 41, pump 42, and line 3 into the launder 65. The two streams mix in the launder 65 and are discharged into the stilling well 41 of clarifier 5. Sludge exits the clarifier at 6 and is sent to the filter. Overflow exists the clarifier at 42 and is discharged into vessel 8, where it is mixed with perlite. Vessel 8 is conveniently equipped with a mixing propeller 43 and means for steam heating shown schematically at 44. The perlite is mixed at 66 into the liquid, which is discharged from vessel 8 via line 44 and pump 45 through lines 46 and 61 where it enters evaporator 10. The acid is initially concentrated in evaporator 10 with the aid of vapor box 47. Water vapor exits via line 48. In practice, line 48 goes to a conventional condenser (not shown), where it is cooled and condensed, and exits the system as liquid via a conventional barometric leg (not shown). Liquid condensate in the vapor box divides into two streams. One stream shown at 49 recycles back to the evaporator 10 via pump 50. The second stream is taken off the vapor box at line 50 where it discharges into evaporator product tank 51 as approximately 50% $P_2O_5$ acid. The overall evaporation system used in this Example is known as "f.c." ("forced circulation") and is conventional in the art. From tank 51 the product exits via line 52, pump 53, line 54, and line 55 to crystallizer 12. Underflow from crystallizer 12 exits via drain 13 and is utilized for its $P_2O_5$ value as herein described. Overflow from crystallizer 12 exits via line 14 into tank 56. This tank is conveniently equipped with propeller mixer 57. Product exits the tank via line 58. It may be collected as the final product at this point via line 59, or it may be further concentrated by returning it to evaporator 10 via lines 60 and 61. After it is once more concentrated, e.g., to 60% $P_2O_5$, it is again collected in evaporator product tank 51 but this time it is sent via line 54 and line 62 to 60% product tank 63, where it is available for final shipment and/or use. This product exits the evaporator at 85°–90° C. As it starts to cool, a very small and harmless amount of solids may precipitate.

The entire system is adequately equipped with valves for control of flow direction in pertinent lines, e.g., valves at 60a, 60b, 61a, 59a, 13a, 55a, 28a, 50a, etc.

In one variation, evaporated product can be returned via lines 58, 60, and 67 to perlite addition vessel 8. To do this, valves 60a and 67a are open; valves 59a and 60b are closed. Also, if for any reason additional perlite is to be added before this product goes through the evaporator the first time, this can be done by closing valve 61a and opening valves 60b and 67a. In essence, this simply recycles the product out of and back into vessel 8.

A mixing tank 40 had a capacity of 211 gallons. It was found that this amount of flocculant solution lasted about one week during normal operation of the pilot plant.

On occasion it is convenient and desirable to add soda ash to the incoming No. 1 filtrate, e.g., to vessel 29. When this feature is employed, the amount of soda ash is conveniently 0.1 to 2.0% by weight of the content of $P_2O_5$.

Soda ash causes precipitation of $Na_2SiF_6$ which in turn helps to sink the flocs.

The aforesaid pilot plant was run semi-continuously (i.e., continuously but with several shutdowns) over a period of some weeks, and the product was used to fill three tank cars.

The values given in Table 1 are typical average values, but, of course, are subject to variation from run to run.

The Equipment

Generally speaking all equipment used in the pilot plant described in FIG. 3, including variations within the pilot plant during the course of filling three tank cars, was of conventional design.

The Clarifier

The clarifier was cylindrical in section with a conical bottom leading to an underflow drain. It was equipped with a stilling well and with rakes generally conforming to the conical bottom and driven by an electrical motor the shaft of which was axial with the center line of the stilling well. The incoming feed from the open trough launder is added to the clarifier through the stilling well in order to minimize turbulence. The clarifier is best described as to capacity as being 6–8 square feet of surface per gallon per minute of feed. This capacity may vary somewhat depending on the type of feed. This again may vary to some extent on the type of reaction system, starting with phosphate rock, etc. In one operation a feed was used where it was necessary to use a clarifier capacity of about 20 square feet/GPM. However 6–12 square feet/GPM is generally suitable.

The clarifier operates at its most efficient when full and when operated on a continuous basis.

The clarifier may be equipped with conventional accessories, e.g., skimmer, overflow weir, etc.

In clarification, the suspended solids that are removed consist mainly of $CaSO_4.2H_2O$, $Na_2SiF_6$, $K_2SiF_6$, and organic materials.

Although flocculation clarification was used in the pilot plant, alternate procedures and equipment are available and are well known to those skilled in the art, e.g., the Lamella settlers, which are a series of parallel spaced-apart plates, somewhat tilted, with very large theoretical settling surface per volume of liquid. Even filtration can be used.

Evaporator

The evaporation in FIG. 3 had a feed rate of 3 to 5 gallons per minute. It was steam-heated, and operated under a vacuum of 24–26 inches (4–6 inches of mercury absolute pressure) in evaporating 29–30% acid to 50% acid, and at 1–2 inches of mercury in concentrating that acid to 60% $P_2O_5$ acid. (Actually, acid analyzing 62–63% $P_2O_5$ was made during some runs of the pilot plant.) It was equipped with a vapor head box for venting vapors via a conventional system.

When the acid is to be shipped away from the plant site, it is preferably concentrated to about 60% $P_2O_5$ to save freight. Otherwise freight has to be paid on the extra water. Concentration to 60% is a good practical upper limit when heating the evaporator with steam. Higher concentrations can be achieved by heating with Dowtherm. If the buyer wants a more dilute grade, he simply adds water.

In using this process in a commercial-size plant the evaporators would be, of course, much larger and with many refinements that would not ordinarily be involved in a pilot plant operation. Commercial evaporators are well known to those skilled in the art and have been described in the standard reference works on phosphoric acid. See, for example, Van Wazer, supra, pp. 1046-7; and 2nd Edition, *Encyclopedia of Chemical Technology*, Vol. 1, page 93.

During evaporation some $SiF_4$ is stripped off, and provision can be made for its recovery by conventional methods.

Crystallizer

Various embodiments were used, and all were found to be generally satisfactory. The one that seemed to perform best was a so-called Pachuca type of section-crystallizer, shown schematically at 12 in FIG. 3. This was generally cylindrical in cross-section with a conical bottom and was equipped with an internal cylinder again terminated with an open conical bottom. A third cylinder open at top and bottom was positioned within the second shell. The outer and middle shells were equipped with rakes generally conforming to the contour of their respective conical bottoms, and driven by an electrical motor and shaft on the center line of the innermost cylinder. The liquid feed product was added into the innermost cylinder along with air to provide aeration. The air was not necessary to prevent post-precipitation in the final product, but did aid in internal liquid recycling, control of scaling, and in the formation of better crystals, within the crystallizer.

The crystallizer works most efficiently when full, and when operated continuously.

The overflow from the crystallizer, i.e., of about 50% $P_2O_5$ product, may contain a few crystals (Fe/Al complexes). These go substantially back into solution during a subsequent concentration, e.g., to 60%, and do not cause sludge problems.

The pilot plant product was used to fill three tank cars, each containing 8000–10000 gallons of 60% acid specific gravity typically 1.818. Each of the three cars was shipped away from the plant site. About 3–4 weeks was required to fill each car, and another three weeks to ship and unload the car. Sludge in all of these three cars was reported as negligible, i.e., about 0.1–0.2% by weight. Furthermore, even this minimal amount was fluid and pumpable, indicating that standard car cleaning equipment would not be required for cars in which the acid of my invention had been shipped.

In this connection it would be common practice for tank cars containing wet process acid, similar to that herein described except not treated by my process, to deposit sludge over the same time period to the extent of about 5%. This sludge deposits in the bottom of the tank car. It cannot be removed conveniently at the point of destination, and generally has no use whatsoever by the purchaser. Customarily the tank car containing the sludge is returned to the production plant, where it is necessary to clean the car using special equipment and hot water or acid to break up the sludge. Great care must be taken in cleaning sludge-containing cars, because phosphoric acid tank cars have a special rubber lining about ¼ inch thick, which must not be broken during the cleaning operation.

Table 2 following provides analytical data for feed, clarifier, crystallizer, and resulting products as made by the process of this invention. As has been mentioned, feed analysis is variable and may depend on the type of rock available and on preceding process factors. Variables for clarification and crystallizer operation have been mentioned in the text. The data in the Table represent typical clarifier and crystallizer runs.

All products within the product columns show great improvement over comparable prior art products as regards post-precipitation. This is true even at the lower $P_2O_5$ grades of acid. My preferred product is the 60% $P_2O_5$ acid, data for which is given in the second product column.

process uneconomical. So far as I can determine, my process is the first to provide a wet process phosphoric acid with a high mineral content and which is nevertheless free from substantial post-precipitation problems.

If desired perlite or other aluminum silicate material can be added again after, e.g., the first evaporation and/or the second evaporator. In such case the stream would pass to a crystallizer for removal of any additional sludge. Ordinarily, however, plural additions of perlite or other aluminum silicate are not necessary.

Some of my sample jars containing product made by this invention have stayed substantially sludge-free for months, and are still sludge-free at the date of this application.

The product has at least all the uses of merchant grade phosphoric acid. It is especially useful in making liquid fertilizers and as a feed for superphosphoric acid.

Preferred Embodiments

The following sets forth some of the embodiments which I prefer in the operation of my process.

The number 1 filtrate is preferably 22–35% $P_2O_5$, and even more preferably 28–32% $P_2O_5$. It enters the process at a temperature preferably within the range 30–65° C., and even more preferably 45°–54° C. The actual temperature of the No. 1 filtrate as used in the pilot plant was about 30° C. If the No. 1 filtrate is colder than the ranges given, it should preferably be steam-heated to bring it up to temperature. The solids content of the No. 1 filtrate may vary typically from 0.5 to 8%. The product that was used in the pilot plant was generally about 3% solids in all cases. The analysis of the No. 1

Table 2
Typical Operating and Product Plant Data
(See especially FIG. 3)

| | Clarifier | | | Crystallizer | | | 52% Acid (1) | 60% Acid Cf.FIG.3 (2) | Products of this Invention | |
|---|---|---|---|---|---|---|---|---|---|---|
| Component Wt. % | Inlet | Over-flow | Under-flow | Inlet | Over-flow | Under-flow | | | Broad operable range | Preferred range for 58–60% acid |
| $P_2O_5$ | 29.30 | 29.30 | 22.40 | 50.10 | 49.40 | 46.20 | 52.41 | 60.00 | 52.00–63.00 | 58.00–60.00 |
| Solids | 3.00 | 0.20 | 25.00 | 0.80 | 0.40 | 20.70 | 0.07 | 0.20 | 0.00–0.50 | 0.00–0.07 |
| $H_2SO_4$ | 3.00 | 2.50 | 12.40 | 3.90 | 3.60 | 6.70 | 4.01 | 4.50 | 3.00–6.00 | 3.00–6.00 |
| CaO | 0.80 | 0.20 | 3.70 | 0.30 | 0.10 | 2.40 | 0.09 | 0.07 | 0.01–0.10 | 0.02–0.25 |
| $SiO_2$ | 0.70 | 0.60 | 1.00 | 0.40 | 0.05 | 0.60 | 0.12 | 0.02 | 0.00–0.20 | 0.00–0.03 |
| F | 1.70 | 1.40 | 3.80 | 0.80 | 0.60 | 2.20 | 0.82 | 0.50 | 0.30–1.50 | 0.35–0.65 |
| $Fe_2O_3$ | 1.10 | 1.10 | 1.00 | 1.80 | 1.50 | 3.30 | 1.74 | 1.90 | 1.00–5.00 | 1.00–3.00 |
| $Al_2O_3$ | 0.80 | 0.80 | 0.70 | 1.40 | 1.40 | 1.40 | 1.58 | 1.70 | 1.00–5.00 | 1.00–3.00 |
| $Na_2O$ | 0.20 | 0.10 | 1.00 | 0.10 | 0.05 | 0.80 | 0.08 | 0.07 | 0.01–0.20 | 0.02–0.17 |
| $K_2O$ | 0.06 | 0.05 | 0.30 | 0.06 | 0.05 | 0.25 | 0.09 | 0.06 | 0.01–0.15 | 0.01–0.12 |
| MgO | 0.30 | 0.30 | 0.30 | 0.50 | 0.50 | 0.50 | 0.62 | 0.60 | 0.30–0.70 | 0.30–0.70 |

(1) Average of 8 runs, using 3 different phosphate rock sources. Solids of 0.07% compares with 5% solids in similar acid not treated by the process of this invention.
(2) Typical average of several runs in pilot plant of Example 3.

The use of perlite to make a grade of wet process phosphoric acid substantially free from post-precipitation has been described in my U.S. Pat. No. 3,907,680, in which perlite was used as a filter bed to remove impurities from phosphoric acid by filtration, thereby to inhibit deposition of sludge in the filtered material. Also perlite has been added to wet process phosphoric acid to remove fluorine therefrom as $SiF_4$; see U.S. Pat. No. 2,987,376 to Gloss, Method for Defluorination of Phosphoric Acid. Also the preparation of a wet process phosphoric acid substantially free from post-precipitation is not new. For example, such material can be prepared by simply permitting sludge to deposit from a standing body of wet process acid until such sludge no longer collects. At this point the upper acid will no longer deposit sludge and can be shipped out as sludge-free acid. However, the amount of storage equipment required and the amount of time required make the filtrate can vary quite a bit, but is typically and preferably approximately that given in Table 2, Clarifier Inlet.

The amount of flocculant is preferably 0.02 to 2.0 pounds per ton of $P_2O_5$ in the No. 1 filtrate; even more preferably this weight ratio is 0.03 to 0.08 pounds per ton of $P_2O_5$. Typically, in my pilot plant runs, 0.05 pounds of flocculant was used per ton of $P_2O_5$. The flocculant is made up into an aqueous solution prior to addition to the No. 1 filtrate. The concentration of this aqueous solution can vary but is preferably within the range of 0.02 to 1.0 weight percent, of flocculant based on the weight of water; even more preferably the range is 0.04 to 0.1 weight percent; typically in the pilot plant runs the concentration was 0.085 weight percent.

The capacity of the clarifier is preferably 5–20 square feet/GPM; even more preferably this range is 6½–8⅓ square feet/GPM. Specifically, in the pilot plant runs, a clarifier was used having a capacity of 8⅛ square feet/GPM. The underflow as a percent of feed to the clarifier is preferably 2 to 20% by volume of the feed; and even more preferably 7 to 9%. The typical ratio as used in the pilot plant was about 8%, based on volume of feed to the clarifier.

As regards addition of perlite or other aluminum silicate material, a preferred range is 1–40 pounds per ton of $P_2O_5$. A more preferred range is 5–15 pounds per ton, and in typical pilot plant usage, I used 6.8 pounds of perlite per ton of $P_2O_5$.

In the first evaporator, it is preferred to concentrate the initial acid to 42–52% $P_2O_5$, and even more preferably 46–50% $P_2O_5$. Pilot plant runs were about 48–50%. If a second evaporator is used, the acid is concentrated to a range of 52–63% $P_2O_5$; and even more preferably 54 to 60% $P_2O_5$. The pilot plant generally gave a product about 60% $P_2O_5$ in the second evaporator.

The crystallizer is preferably adjusted to give about 10 to 40 weight percent solids in the underflow; even more preferably this range is 20 to 25 percent. In the pilot plant the weight of solids in the underflow averaged about 23.6%. To achieve this the underflow volume based on the feed, is preferably 1–10%, and even more preferably 1–4%. A typical ratio in the pilot plant was about 2%.

My analyses suggest that the solid product of the crystallizer is an undefined conglomerate, mostly of iron, calcium, and aluminum phosphates; calcium sulfate, and fluoride; and with minor amounts of insoluble complex phosphates and/or fluorides of sodium, potassium, strontium/titanium, and magnesium. This composition is suggested by the following typical analyses of solids taken from the crystallizer underflow. As is evident, analyses for the same sample can vary considerably, depending on preparation, washing, etc.

One sample of crystallizer solids, immediately below, was centrifugally filtered. It was done this way in order to obtain a cake with a low content of liquid. The cake was removed and assayed "as is". This is sample No. 1. Part of this cake was also acetone washed and assayed without removing the excess acetone. This is sample No. 2. Data are in weight percent.

|  | No. 1 (As Is) | No. 2 (Acetone Washed) |
|---|---|---|
| $P_2O_5$ | 46.50 | 41.00 |
| CaO | 3.51 | 3.90 |
| $SiO_2$ | 0.13 | 0.21 |
| $Fe_2O_3$ | 8.22 | 15.10 |
| $Al_2O_3$ | 1.02 | 3.35 |
| F | 1.23 | 2.04 |
| $H_2SO_4$ | 9.03 | 12.83 |
| MgO | 0.40 | 0.22 |
| $Na_2O$ | 0.63 | 1.03 |
| $K_2O$ | 0.73 | 0.78 |

Another sample was also centrifugally filtered, but this time washed with water while still being centrifuged. The cake was again divided, one sent to analysis "as is", the other acetone washed. These are Nos. 3 and 4 respectively.

|  | No. 3 (As Is) | No. 4 (Acetone Washed) |
|---|---|---|
| $P_2O_5$ | 30.20 | 38.35 |
| CaO | 3.96 | 11.05 |
| $SiO_2$ | 0.02 | 0.03 |
| $Fe_2O_3$ | 9.62 | 15.25 |
| $Al_2O_3$ | 0.67 | 3.25 |
| F | 0.27 | 0.41 |
| $H_2SO_4$ | 13.51 | 17.16 |
| MgO | 0.03 | 0.02 |
| $Na_2O$ | 0.29 | 0.33 |
| $K_2O$ | 0.77 | 0.79 |

Another underflow sample was obtained which was an accumulation of the settled crystals over the 2nd and 3rd shifts on one day and the first part of the 1st shift on the following day. I sent to analysis a sample "as is" (No. 5) from the "head sample" above described.

|  | No. 5 Underflow As Is |
|---|---|
| $P_2O_5$ | 44.40 |
| CaO | 2.61 |
| $SiO_2$ | 1.90 |
| $Fe_2O_3$ | 3.39 |
| $Al_2O_3$ | 1.50 |
| F | 3.39 |
| $H_2SO_4$ | 7.94 |
| MgO | 0.59 |
| $Na_2O$ | 0.74 |
| $K_2O$ | 0.38 |
| Solids | 23.87 |

Four additional samples of about 400 cc each were centrifugally filtered. The first sample was centrifuged only, producing a cake and a filtrate. These are Nos. 6 and 7. The second was washed with 600 cc water only. The cake is No. 8 while the filtrate, which is now a mixture of the displaced acid and water, is No. 9. The next sample was washed with 400 cc acetone and the last with alcohol. These are identified at the head of each column (Nos. 10–13).

|  | No. 6 Cake As Is | No. 7 Filtrate (Acid Only) | No. 8 Water Washed Cake (Not Dried) | No. 9 Acid + Water |
|---|---|---|---|---|
| $P_2O_5$ | 33.75 | 47.50 | 24.75 | 28.80 |
| CaO | 8.46 | 0.17 | 10.04 | 0.23 |
| $SiO_2$ | 0.95 | 0.12 | 5.17 | 0.29 |
| $Fe_2O_3$ | 6.75 | 1.16 | 8.30 | 0.61 |
| $Al_2O_3$ | 2.10 | 1.47 | 1.80 | 0.85 |
| F | 8.15 | 0.68 | 9.01 | 0.68 |
| $H_2SO_4$ | 1.39 | 4.30 | 1.52 | 2.90 |
| MgO | 0.58 | 0.59 | 0.51 | 0.40 |
| $Na_2O$ | 0.77 | 0.07 | 0.76 | 0.34 |
| $K_2O$ | 0.50 | 0.03 | 0.52 | 0.03 |

|  | No. 10 Cake (Acetone Washed-Vacuum Dried) | No. 11 Filtrate (Acid + Acetone) | No. 12 Cake (Alcohol Washed-Vacuum Dried) | No. 13 Filtrate (Acid + Alcohol) |
|---|---|---|---|---|
| $P_2O_5$ | 29.88 | 34.60 | 27.38 | 37.80 |
| CaO | 11.77 | 0.08 | 12.81 | 0.06 |
| $SiO_2$ | 6.02 | 0.12 | 6.93 | 0.00 |
| $Fe_2O_3$ | 10.05 | 0.76 | 10.75 | 0.80 |
| $Al_2O_3$ | 0.43 | 0.96 | 1.65 | 1.08 |
| F | 9.47 | 0.46 | 10.78 | 0.49 |
| $H_2SO_4$ | 19.31 | 3.00 | 20.56 | 3.30 |
| MgO | 0.65 | 0.45 | 1.61 | 0.48 |
| $Na_2O$ | 0.13 | 0.02 | 0.78 | 0.04 |
| $K_2O$ | 0.14 | 0.02 | 0.53 | 0.02 |

A curious difference in the product of this invention and merchant grade phosphoric acid of the prior art is its behavior upon ammoniation to make a "9-27-0" slurry fertilizer. Ordinarily, when merchant grade acid of the prior art is reacted with ammonia to give ammonium phosphates in suspension, e.g., in making 9-27-0 liquid fertilizer slurries, the suspension is black, owing, it is thought, to suspended carbon in the acid. However, when my product is similarly ammoniated, the resulting ammonium phosphate suspension is brown-colored.

Although perlite is the preferred additive, and is exemplified in the above runs, aluminum silicates generally appear to be operable in the process of this invention. (Perlite is an aluminum silicate.) Another aluminum silicate which has been tried is a material obtained as a byproduct in the preparation of sodium fluoride for bauxite refining. It is referred to herein as Aluminum Silicate A. Its analysis is given below, compared to a range typical of perlites. (Values in percent by weight.)

|  | ALUMINUM SILICATE A AS REC'D | CALCULATED TO DRY BASIS | TYPICAL PERLITE |
|---|---|---|---|
| $P_2O_5$ | 0.50 | 0.96 | 0.01 to 0.12 |
| CaO | 0.07 | 0.13 | 0.78 to 3.8 |
| $SiO_2$ | 35.66 | 68.55 | 67 to 75 |
| $Fe_2O_3$ | 0.00 | 0.00 | 0.25 to 3.2 |
| $Al_2O_3$ | 5.70 | 10.96 | 10 to 19 |
| F | 6.56 | 12.61 | — |
| MgO | 0.01 | 0.02 | 0.01 to 0.70 |
| Dry Solids | 52.02 | 100.00 | — |
| $Na_2O$ | 0.05 | 0.10 | 1.2 to 4.2 |
| $K_2O$ | 0.02 | 0.04 | 2.2 to 6 |

It can be noted that the $SiO_2$ and $Al_2O_3$ of the Aluminum Silicate A on a dry basis are within the ranges shown for perlite. The $Na_2O$ and $K_2O$, however, are outside of the ranges indicated for perlite.

The following are typical bench scale results when using Aluminum Silicate A compared to perlite, in the process of this invention.

The first column is a control. The second column is perlite and the third column is Aluminum Silicate A adjusted to be equivalent to dry perlite.

All of the following analyses are on product acid.

| ACID ANALYSIS | FIRST CONTROL[1] | PERLITE[2] ¼% of the $P_2O_5$ | ALUMINUM SILICATE[3] ¼% dry basis of the $P_2O_5$ |
|---|---|---|---|
| $P_2O_5$ | 59.90 | 60.90 | 59.30 |
| CaO | 0.05 | 0.07 | 0.19 |
| $SiO_2$ | 0.00 | 0.00 | 0.00 |
| $Fe_2O_3$ | 2.03 | 2.13 | 2.08 |
| $Al_2O_3$ | 2.22 | 2.28 | 2.61 |
| F | 0.69 | 0.59 | 0.72 |
| $H_2SO_4$ | 5.47 | 5.85 | 5.61 |
| MgO | 0.59 | 0.62 | 0.61 |
| Solids | 0.91 | 0.04 | 0.10 |
| $Na_2O$ | 0.07 | 0.07 | 0.05 |
| $K_2O$ | 0.09 | 0.09 | 0.10 |

[1]Shows layer of sediment on bottom and wall scaling after one month.
[2]Thin layer of crystals on bottom; no wall scaling after one month.
[3]Thin layer of crystals on bottom; some wall scaling after one month.

| ACID ANALYSIS | SECOND CONTROL[1] | PERLITE[2] 1% of the $P_2O_5$ | ALUMINUM SILICATE A[3] 1% dry basis of the $P_2O_5$ |
|---|---|---|---|
| $P_2O_5$ | 59.70 | 59.20 | 60.20 |
| CaO | 0.05 | 0.16 | 0.07 |
| $SiO_2$ | 0.00 | 0.00 | 0.00 |
| $Fe_2O_3$ | 1.45 | 1.45 | 1.44 |
| $Al_2O_3$ | 2.03 | 2.10 | 2.15 |
| F | 0.59 | 0.84 | 0.61 |
| $H_2SO_4$ | 4.39 | 4.28 | 4.42 |
| MgO | 0.54 | 0.55 | 0.54 |
| Solids | 1.03 | 0.00 | 0.00 |
| $Na_2O$ | 0.05 | 0.04 | 0.04 |
| $K_2O$ | 0.10 | 0.09 | 0.10 |

[1]Layers of sediment on bottom and wall scale after one month.
[2]Slight layer on bottom; no scale after one month.
[3]Slight layer on bottom; slight wall scale after 1 month.

In general, by equal substitution of perlite and Aluminum Silicate A, an acceptable product was obtained in the laboratory. However, scaling on the walls of the sample jars was noticeable in the Aluminum Silicate A samples whereas no scaling occurred with the perlite samples.

Aluminum Silicate A offered a problem in that during concentration of the acid in the pilot plant evaporator, scale tended to deposit on the interiors of the evaporator tubes. In one run the tubes plugged on account of scaling. This problem was not encountered with perlite. In a commercial plant this problem would require that the tubes be descaled from time to time. (As a matter of fact, scaling is a common problem in commercial phosphoric acid evaporators, aside from the use of Aluminum Silicate A, and a typical evaporator must be shut down for cleaning after, say, 240 hours of operation. Perlite may be unique in that it causes little or no evaporator scaling.) Another aluminum silicate, kaolin, was tried. Kaolin is a clay, consisting principally of kaolinite, $Al_2O_3 \cdot 2SiO_2 \cdot 2H_2O$. In one mode I used kaolin in its natural form. In another mode I calcined the kaolin to drive off the water. Both forms performed about like Aluminum Silicate A, i.e., they both gave fair prevention of post precipitation (though not as good as perlite) and both gave typical scaling in the evaporator.

The results below are bench scale tests with kaolin compared to perlite, at 1% of the $P_2O_5$.

|  | KAOLIN CALCINED[1] | KAOLIN AS REC'D | PERLITE |
|---|---|---|---|
| $P_2O_5$ | 60.40 | 60.00 | 61.20 |
| CaO | 0.15 | 0.16 | 0.10 |
| $SiO_2$ | 0.04 | 0.03 | 0.01 |
| $Fe_2O_3$ | 2.67 | 2.65 | 2.65 |
| $Al_2O_3$ | 2.46 | 2.46 | 2.34 |
| F | 0.98 | 1.01 | 0.88 |
| $H_2SO_4$ | 4.90 | 4.80 | 4.70 |
| MgO | 0.65 | 0.65 | 0.66 |
| Solids | 0.16 | 0.23 | 0.04 |
| $Na_2O$ | 0.03 | 0.04 | 0.04 |
| $K_2O$ | 0.12 | 0.12 | 0.12 |

[1]Calcined at 1420° F for ½ hour.

Below is an analysis of the kaolin on an as received basis:

| $P_2O_5$ | 0.00 | $H_2SO_4$ | 0.35 |
|---|---|---|---|
| CaO | 0.36 | MgO | 0.12 |
| $SiO_2$ | 56.44 | | |
| $Fe_2O_3$ | 1.20 | $K_2O$ | 0.24 |
| $Al_2O_3$ | 41.71 | Free $H_2O$ | 0.97 |
| F | 0.01 | Comb. $H_2O$ | 14.36 |

The above runs with Aluminum Silicate A and kaolin were made in a pilot plant using a procedure like that described in Example 2.

I claim:

1. The method of preparing a wet process phosphoric acid substantially free from post-precipitation that includes the steps:

(a) to a wet process phosphoric acid having a $P_2O_5$ content of 22 to 35 weight percent from which the suspended solids have been removed, adding 0.05 to 2.0 weight percent of an aluminum silicate material based on the contained weight of $P_2O_5$ in the acid to provide an aluminum silicate material-acid mix; said aluminum silicate material being finely divided so as to be soluble in the phosphoric acid as the concentration of the acid is increased from 22–35 weight percent $P_2O_5$ to 42–52 weight percent $P_2O_5$;

(b) concentrating the aluminum silicate material-acid mix to said 42–52 weight percent $P_2O_5$ in an evaporation zone thereby to provide an aluminum silicate material/acid solution;

(c) transferring the concentrated solution to a crystallizing zone having an overflow stream and an underflow stream;

(d) recovering the overflow stream as wet-process phosphoric acid substantially free of post precipitation.

2. The method of preparing a wet process phosphoric acid substantially free from post-precipitation that includes the steps:

(a) to a wet process phosphoric acid having a $P_2O_5$ content of 22 to 35 weight percent from which the suspended solids have been removed, adding 0.05 to 2.0 weight percent perlite based on the contained weight of $P_2O_5$ in the acid to provide a perlite-acid mix, said perlite being finely divided so as to be soluble in the phosphoric acid as the concentration of the acid is increased from 22–35 weight percent $P_2O_5$ to 42–52 weight percent $P_2O_5$;

(b) concentrating the perlite-acid mix to said 42–52 weight percent $P_2O_5$ in an evaporation zone thereby to provide a perlite/acid solution;

(c) transferring the concentrated solution to a crystallizing zone having an overflow stream and an underflow stream;

(d) recovering the overflow stream as wet-process phosphoric acid substantially free of post precipitation.

3. The method according to claim 2, step (a), in which the perlite added is 0.25–0.75 wt. %.

4. The method according to claim 3 in which the perlite added is 0.3–0.4 wt. %.

5. The method according to claim 2 wherein solids removal in step (a) is accomplished by starting with an initial feed containing 0.5–8.0 weight percent of suspended solids, adding flocculant thereto in a mixing zone, transferring the mixture to a clarification zone with an overflow and an underflow, and discharging the overflow as feed for mixing with perlite in a second mixing zone; said overflow being clarified phosphoric acid substantially free of suspended solids and said underflow carrying substantially all the suspended solids of the initial feed.

6. The method according to claim 5 in which the phosphoric acid, after concentration to 42 to 52 $P_2O_5$, and subjected to crystallization is subsequently evaporated up to a concentration up to 63% $P_2O_5$.

7. The method according to claim 5 in which the initial feed contains approximately the following:

|  | Wt. % |
|---|---|
| $P_2O_5$ | 29.3 |
| Solids | 3.0 |
| $H_2SO_4$ | 3.0 |
| CaO | .8 |
| $SiO_2$ | .7 |
| F | 1.7 |
| $Fe_2O_3$ | 1.1 |
| $Al_2O_3$ | .8 |
| $Na_2O$ | .2 |
| $K_2O$ | .06 |
| MgO | .3 |

8. The method according to claim 5 in which the clarifier underflow is 2 to 20 volume percent of the clarifier inlet stream.

9. The method according to claim 8 in which the clarifier underflow is 4–10 volume percent of the inlet stream.

10. The method according to claim 9 in which the clarifier underflow is 8 volume percent of the inlet stream.

11. The method according to claim 6 in which the underflow from the crystallizing zone is 1 to 10 volume percent of the crystallizing zone inlet stream.

12. The method according to claim 11 in which the crystallizing zone underflow stream is 1–4 volume percent of the inlet stream.

13. The method according to claim 5 in which all steps are operated substantially continuously.

14. The method according to claim 5 in which soda ash in an amount which is 0.1 to 2.0 weight percent of the $P_2O_5$ in the feed is added to the feed prior to transferring the mixture of feed and flocculant to the clarification zone.

15. The method according to claim 1 in which the aluminum silicate material has approximately the following analysis (dry solids basis):

|  | Wt. % |
|---|---|
| $P_2O_5$ | 0.96 |
| CaO | 0.13 |
| $SiO_2$ | 68.55 |
| $Fe_2O_3$ | 0.00 |
| $Al_2O_3$ | 10.96 |
| F | 12.61 |
| MgO | 0.02 |
| $Na_2O$ | 0.10 |
| $K_2O$ | 0.04 |
| Unidentified to make | 100.00 |

16. The method according to claim 1 in which the aluminum silicate material is kaolin.

* * * * *